United States Patent

[11] 3,601,701

[72] Inventor Robert F. Salmon
Cedar Rapids, Iowa
[21] Appl. No. 860,880
[22] Filed Sept. 25, 1969
[45] Patented Aug. 24, 1971
[73] Assignee Collins Radio Company
Dallas, Tex.

[54] BI-PHASE KEYED MODULATOR-DEMODULATOR SYSTEM
12 Claims, 5 Drawing Figs.

[52] U.S. Cl. .......... 325/30, 178/67, 178/88, 325/163, 325/320, 333/11
[51] Int. Cl. .......... H04b 1/04, H04b 1/16
[50] Field of Search .......... 325/30, 126, 163, 487, 320; 333/7, 11; 329/116, 117, 118, 160, 161, 162; 178/66, 67, 88

[56] References Cited

UNITED STATES PATENTS

| | | | |
|---|---|---|---|
| 2,666,134 | 1/1954 | Dicke | 325/446 X |
| 2,970,214 | 1/1961 | Parzen | 329/116 X |
| 3,349,342 | 10/1967 | Garver | 325/445 X |
| 3,509,494 | 4/1970 | Kawahashi | 329/161 X |

*Primary Examiner*—Robert L. Griffin
*Assistant Examiner*—Kenneth W. Weinstein
*Attorneys*—Robert J. Crawford and Bruce C. Lutz

ABSTRACT: At the transmitter, a first switching means connects first symmetric ports of an E plane T junction and an H plane T junction together and a second switching means connects the other symmetric ports of the two T junctions together. Modulating means operates the two switches in an alternate manner so that an input signal supplied to the collinear port of one T junction will have either a 0° or a 180° phase shift at the collinear port of the other output T junction, depending upon which switching means is conductive. At the receiver a hybrid T junction is provided with the output signal of said output T junction being supplied to one symmetric port thereof and a constant phase reference signal to the other symmetric port. An output signal will appear either at the H port or the E port of the hybrid T junction depending upon the phase of the received signal.

FIG. I

INVENTOR.
ROBERT F. SALMON

BY D.W. Phillips
ATTORNEY

INVENTOR.
ROBERT F. SALMON
BY D.W. Phillips
ATTORNEY

INVENTOR.
ROBERT F. SALMON
BY D. W. Phillips
ATTORNEY

INVENTOR.
ROBERT F. SALMON

BY Donald W. Phillion
ATTORNEY

INVENTOR.
ROBERT F. SALMON

BY Donald W. Phillips
ATTORNEY

BI-PHASE KEYED MODULATOR-DEMODULATOR SYSTEM

This invention relates generally to a biphase (antipodal) modulator/demodulator system and more particularly, to a modulator/demodulator system capable of transmitting and receiving data bits at rates in excess of 200megabits per second.

With the rapid development of data technology, there is a growing need for higher and higher data transmission rates. At the present time, one of the more common ways of transmitting data is through the use of biphase modulated carrier waves where the unmodulated form of the carrier wave represents a binary one, for example, and the carrier wave phase shifted by 180° represents a zero. With present day technology, it is possible to generate and transmit data at a maximum rate of about 40 to 50 megabits per second using the aforementioned encoding technique. Such transmission rates of 40 to 50 megabits per second is presently obtainable using circuits employing discreet components and also with various types of integrated circuits. However, the inherent capacitances and inductances in both types of circuits presents substantial difficulties when an attempt is made to increase the transmission rates above 40 to 50 megabits per second. One serious problem is the presence of perturbations and distortions into the carrier signal when the carrier wave is switched from its unmodulated form to its modulated form, 180° removed therefrom, and vice versa. Such perturbations and distortions are severe enough and exist for a sufficient time interval after each transition to limit transmission rates, using the aforementioned techniques to a maximum value of about 40 to 50 megabits per second. It is a primary object of the present invention to provide an antipodal phase keyed modulator capable of generating a biphase signal capable of modulating data bits upon a carrier signal at the rate in excess of 200 megabits per second.

A second aim of the invention is a demodulator circuit capable of demodulating a received signal, having data encoded there upon in an antipodal biphased manner, and with a density of 200 or more megabits per second.

Before setting forth a statement of the invention, it will facilitate in understanding thereof to first note that a signal traveling in a wave guide can be represented by a three-dimensional vector diagram which includes; a Poynting's vector $\overline{P}$ that is always in the direction of energy flow, a magnetic field vector $\overline{H}$ which is normal to the vector $\overline{P}$, and the electric field vector $\overline{E}$ which is normal to both the vectors $\overline{P}$ and $\overline{H}$. In any given wave guide configuration, the vector $\overline{E}$ will be a normal to one set of sides of the wave guide and the vector $\overline{H}$ will be normal to the other set of sides of the wave guide.

In accordance with the present invention, the carrier signal having a frequency of the order of 9 gigaHertz is supplied to the collinear port of an H plane T junction, which, by definition, implies that the electric field vector $\overline{E}$ is normal to the plane of the T junction. Said signal is divided in the H plane T junction and is then supplied in parallel manner to the two output symmetric branches or ports thereof. The $\overline{E}$ vectors of the two signals flowing in the two symmetrical branches are still both normal to the H plane of the junction and consequently are still in phase with each other. However, the $\overline{H}$ vector of the two signals appearing in the two symmetric ports of the junction are 180° out of phase with each other, since the input signal physically rotated 90° in one direction as it turned into one symmetrical port and rotated 90° in the other direction as it turned into the other symmetrical port.

First and second circuit means, each comprising a switch, connect the first and second symmetrical ports of said junction to first and second input symmetric ports of an E plane T type junction, in which, by definition, the $\overline{H}$ vector is normal to the plane of the junction, and the $\overline{E}$ vector lies in the plane of the junction. Thus as the two signals supplied to the two input symmetric ports of said E plane T junction make the turn into the collinear leg of said E plane T junction, one signal will be rotated around its $\overline{H}$ vector 90° in a first direction, and the other signal will be rotated around its $\overline{H}$ vector 90° in the other direction, thus positioning the $\overline{E}$ vectors 180° out of phase with each other.

Such positioning of the $\overline{E}$ vectors is, by definition, a 180° phase difference between the two signals.

Means are provided to alternately operate said first and second switches to cause one to be on while the other is off. The modulating signal is, in fact, the data to be encoded on the carrier signal and can be in the form of a two-level signal wherein one level represents binary ones and the other level represents binary zeros. A binary one will cause one such switch to be on and the other switch to be off. A binary zero, i.e., the other level of said modulating signal, will reverse the states of the two switches. Thus only one of the two output signals from the H plane T junction can be supplied into the E plane T junction at any given time, and, in effect, since one or the other of such output signals is always being supplied to the E plane T junction, however, the net result is that there is supplied to said E plane T junction a continuous wave signal whose phase reverses in accordance with the level of said modulating signal.

At the receiver the demodulator comprises a hybrid T junction having its two symmetric ports function as inputs, and the H and E collinear ports function as outputs. The received signal is supplied to a first of said symmetric input ports and to the second of said input ports a reference signal is supplied to the second symmetric port. Said reference signal is phase locked to either that portion of the received carrier signal representing a binary one or that portion representing a binary zero. The said hybrid T junction combines the said reference signal with that portion of the received carrier signal having a first phase to produce an output at said H port and no output at said E port. The hybrid T junction further functions to combine said reference signal with that portion of the received carrier signal having the inverted phase produce an output signal at said E port, but no output signal at said H port. The foregoing will be more apparent when it is realized that the $\overline{E}$ vectors of the reference signal and the input signal must either be in phase or 180° out of phase. If they are in phase, they will remain in phase as the two signals physically turn 90° into the H port since both of said signals will rotate around said $\overline{E}$ vector. On the other hand, however, as the received and reference signals physically turn 90° into the E port, they will each rotate 90° around the H vector. Since the rotation of the two signals are in opposite directions the $\overline{E}$ vectors, originally in phase, will become 180° out of phase with each other.

Thus the hybrid T junction at the receiver effectively divides the received modulated carrier signal into two portions in accordance with the phase thereof. One of said portions is supplied to said H port and is that portion of the carrier signal having a first phase, and the second portion is supplied to said E port and is that portion of the received carrier signal having the reversed phase. Suitable envelope detecting means are provided to detect the output of either the E port or the H port or to recover the two-level data signal employed as a modulating signal at the transmitter.

In accordance with another form of the invention, the H plane T and the E plane T junction comprising the transmitter portion of the system can be interchanged so that the input signal is supplied to the collinear port of the H plane T junction and the output signal is taken from the collinear port of the E plane T junction.

The above-mentioned and other objects and features of the invention will be more fully understood from the following detailed description thereof in which.

Figure 1:
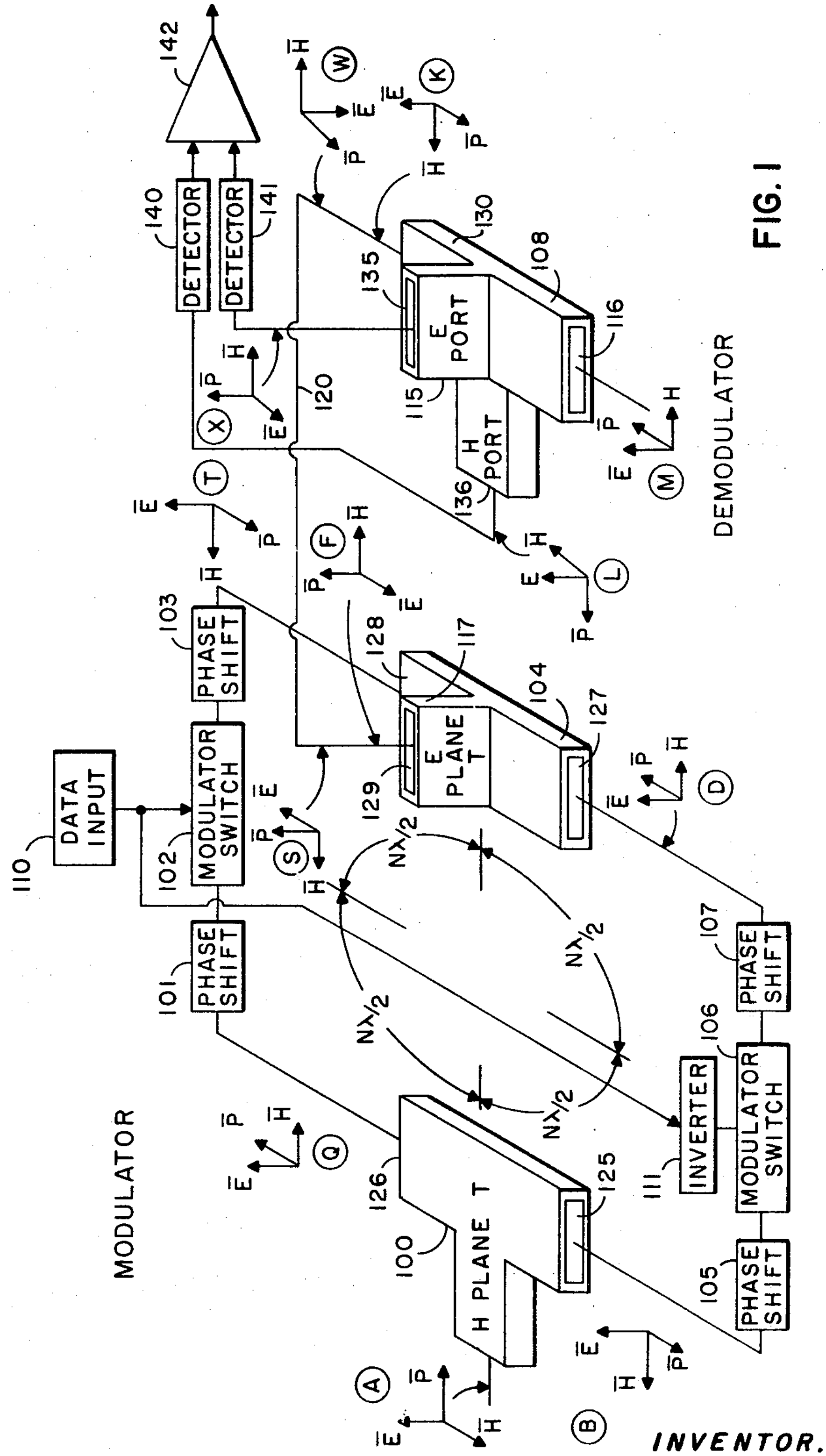
FIG. 1 is a block diagram of the circuit and a perspective view of the T junctions employed therein.

In describing the invention, FIG. 1, which is a sketch of the complete system, will first be discussed to show the general operation of the invention and to illustrate how the H plane T 100 supplies the signal, in response to the level of the modulating signal into one of two parallel circuit paths to the E plane T junction 104 where the two signals are recombined and a 180° phase shift is introduced there between. FIG. 1 will also be employed to show generally how the composite modulating signal is demodulated in the hybrid T junction 108 located at the receiver.

Figure 3:
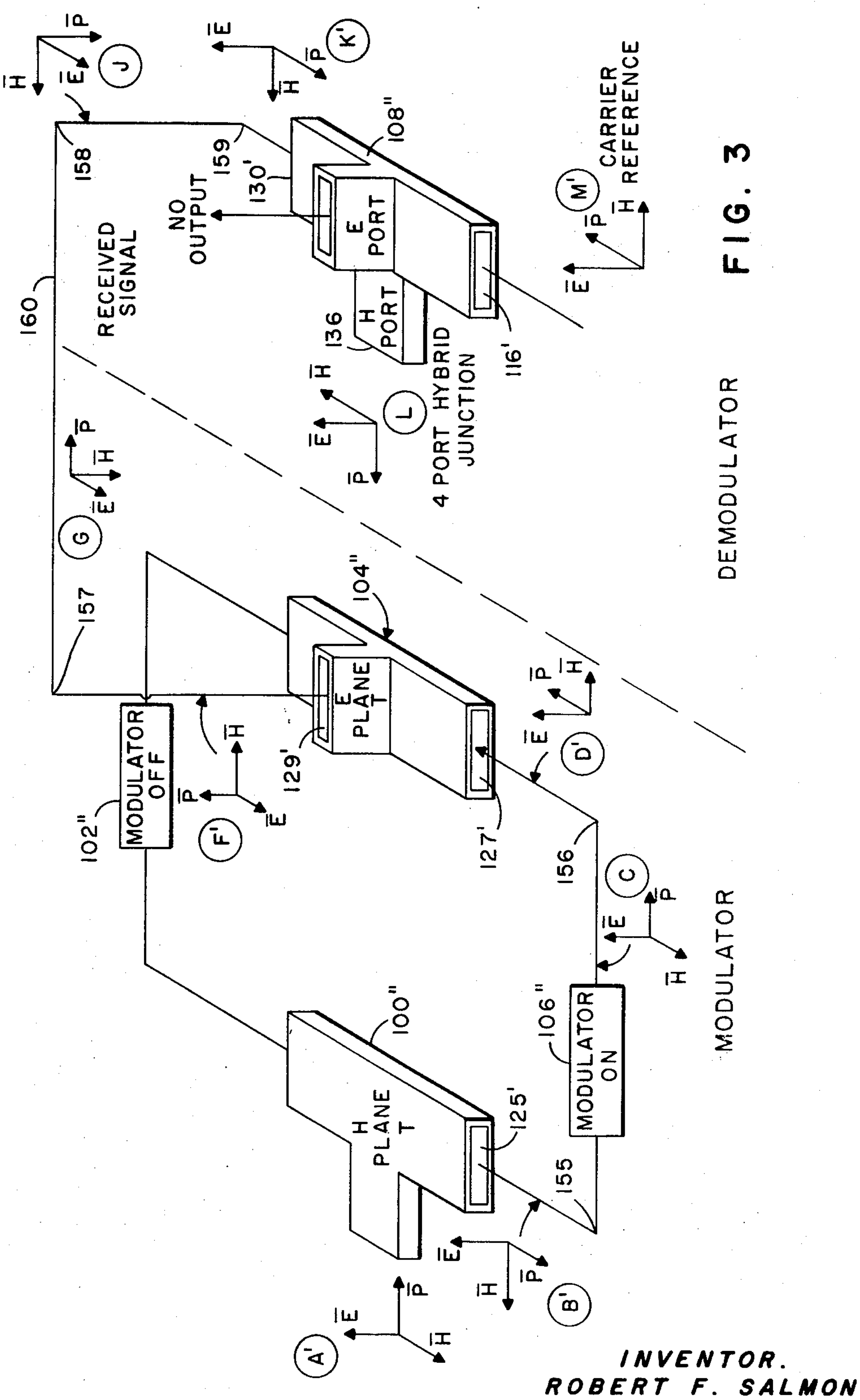
FIG. 3 is a modified diagram of the system showing the T junctions at the transmitter and at the receiver, and showing the vector diagrams and the circuit path of the carrier signal when it is modulated by a first level of the modulating signal.
Figure 4:
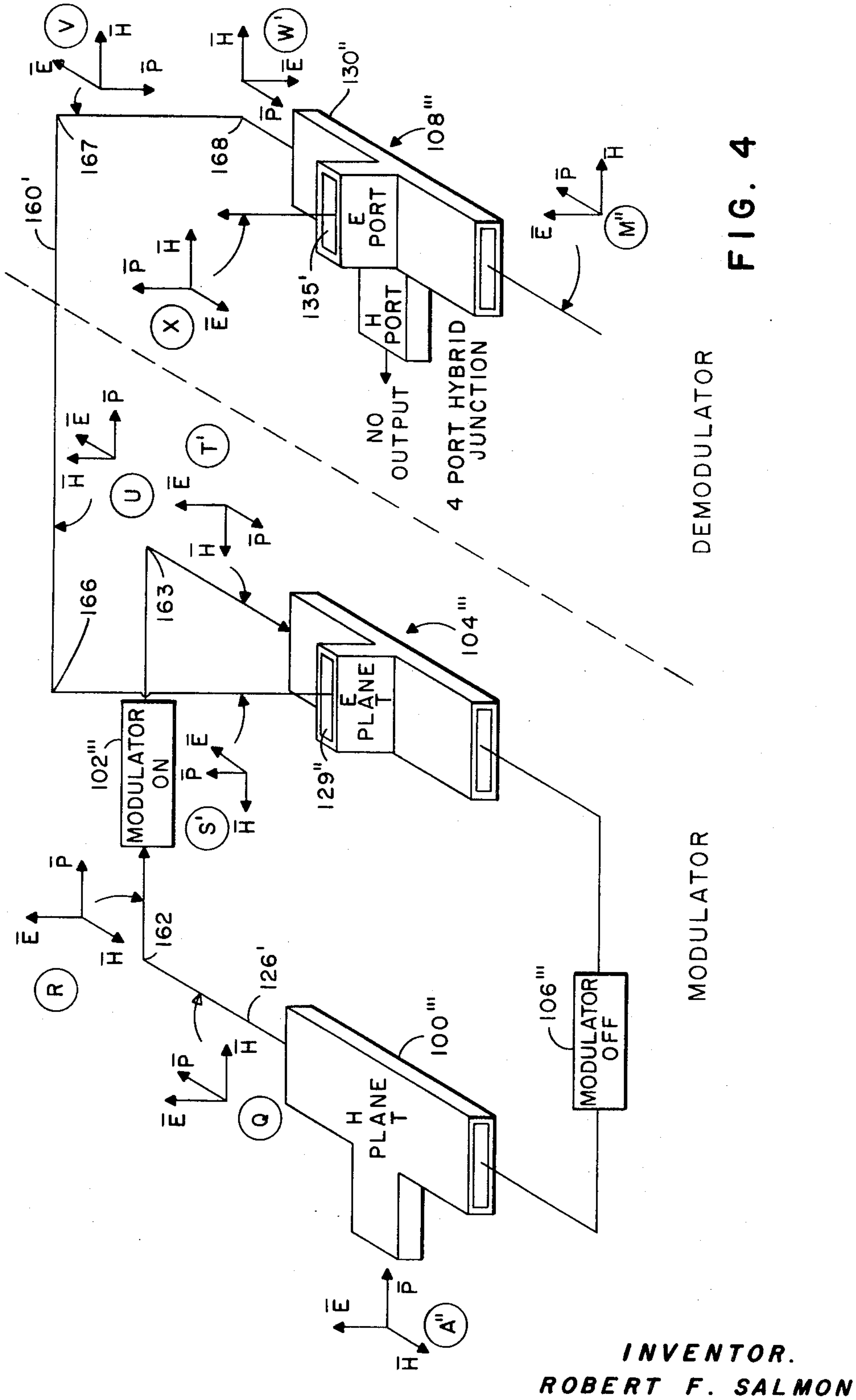
FIG. 4 is another diagram similar to that of FIG. 3, but showing the vector diagrams and the circuit path for the carrier signal when modulated by the other level of the modulating signal.
Figure 5:
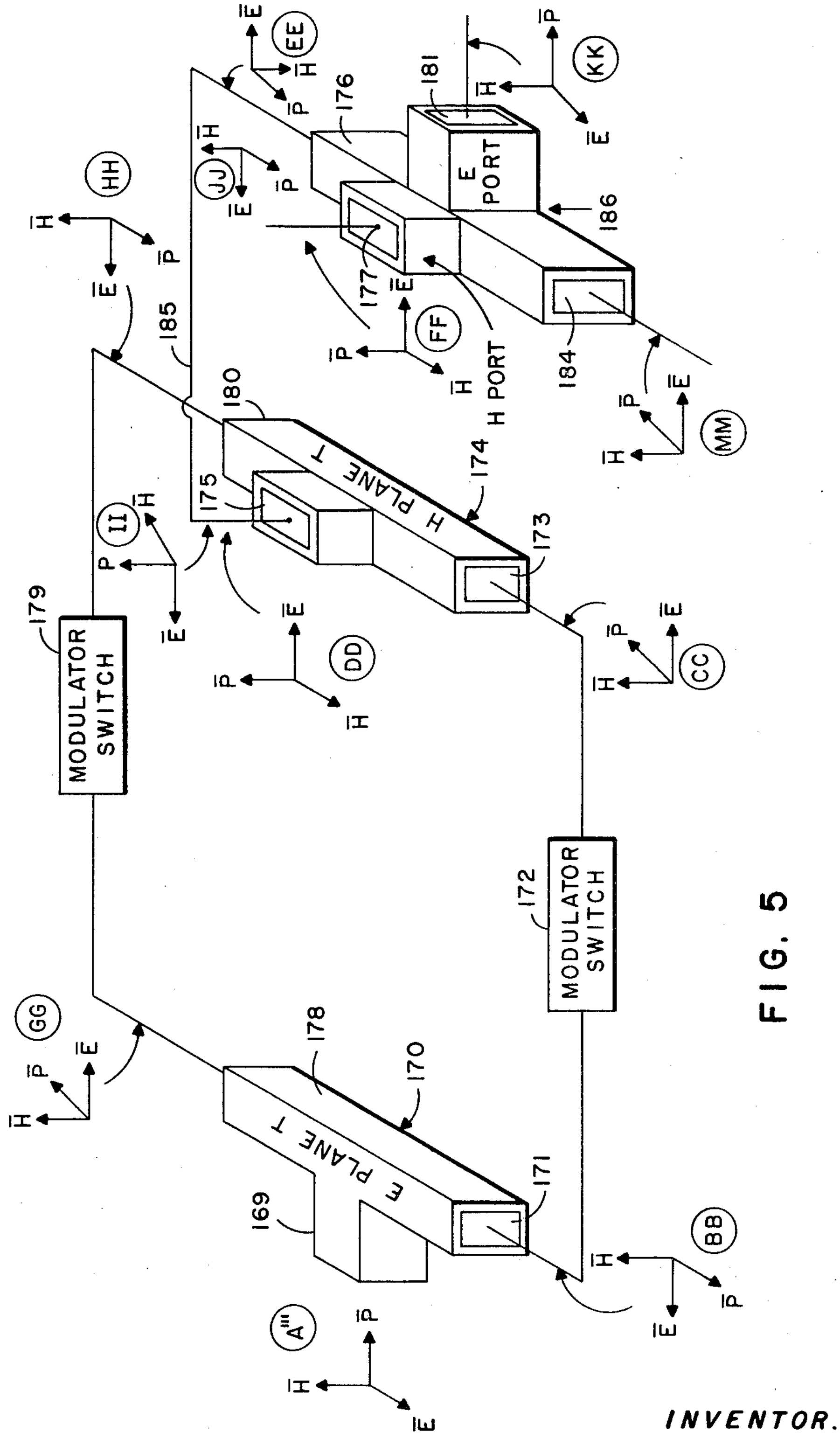
FIG. 5 shows a block diagram of another form of the invention wherein the input signal is supplied to the collinear port of the E plane T junction or H plane T junction that is extracted from the collinear port of the E plane T junctions.

Next FIG. 2, which shows a block diagram of the invention, will be discussed to illustrate more clearly in the operation of the invention. FIG. 3 and FIG. 4 will then be discussed to show in detail the modulation and demodulation of each of the two phase modes of the carrier signal. FIG. 5 which shows another form of the invention, will then be discussed.

Referring now to FIG. 1, an input signal is supplied to the minor port of H plane T junction 100. The input lead can be any suitable lead such as a wave guide or a coaxial cable.

The input signal is represented in FIG. 1 by the vector diagram A, which can represent, for example, a 9.2 gHz. sine wave signal. The vector diagram A is comprised of three vectors, $\bar{P}$, $\bar{E}$ and $\bar{H}$, which represent, respectively, the Poynting vector $\bar{P}$, the electric field vector $\bar{E}$, and the magnetic field vector $\bar{H}$. As is well known in the art, the Poynting vector $\bar{P}$ will always point in the direction of energy flow in a wave guide. Further, in an H plane T junction, such as junction 100 of FIG. 1, the $\bar{E}$ vector is normal to the plane of the T junction by definition. The input signal will enter the collinear port of T junction 100 and will be polarized as represented by vector diagram A.

This input signal will physically turn either to the left or to the right in the T junction 100, depending upon the condition of the switches 102 and 106. More specifically, when switch 106 is open, i.e., conductive, the input signal will turn to the right in T junction 100 and will pass through phase shifting means 105, switch 106, phase shifting means 107, and then into the symmetric port 127 of the E plane T junction 104.

It is to be noted that switches 102 and 106 operate in an alternate manner, so that when one is conductive, the other is not conductive. Thus, during those periods of time when switch 102 is conductive and switch 106 is nonconductive, the input signal to the T junction 100 will turn to the left and will flow through phase shift means 101, switch 102, phase shift means 103, and then to the other symmetric port 128 of E plane T junction 104.

Each of the switches 102 and 106 functions to either short the transmission line when in an off (nonconductive) condition, or to complete the transmission line and provide a continuous path for the transmission of energy therethrough, when in an on (conductive) condition.

In order to avoid standing waves and other losses in the two circuit paths extending between the T junction 100 and the T junction 104, there are provided phase shift devices 101, 103, 105 and 107, which are adjusted so that the spacing between each of the two switches 102 and 106 and each of the two T junctions 100 and 102 to which they are connected, is N/2 wavelengths, where N is an integer.

Implementation and control of the alternate operation of switches 102 and 106 is obtained by means of the two-level data input source 110 which is connected directly to switch 102, and through an inverter 111 to switch 106. When the output signal of data source 110 is at a first level, the switch 102 is conductive and the switch 106 is nonconductive. When the output signal of data source 110 is at its other level, the switch 102 is nonconductive, and the switch 106 is conductive.

As mentioned above, data source 110 can supply data to the system at a rate of 200 or more megabits per second, so that switches 102 and 106 are turned on and off at this 200 or more megabits per second rate. Thus energy from the H plane T junction 100 is supplied alternately through the two paths including switches 102 and 106, respectively, to the E plane T junction 104 at the 200 megabits per second rate.

When switch 102 is conductive, the energy flow from T junction 100 is represented by vector diagram Q, such energy flows through phase shift means 101, switch 102, phase shift means 103, and to the symmetric port 128 of the E plane T junction 104. The aforementioned energy flowing into said port 128 is represented by vector diagram T, which can be seen to have the same orientation with respect to the connecting circuit path as the vector diagram Q. As the incoming signal flows into the T junction 104 it will make a 90° turn upwards into the collinear E port 129. However, in making this turn, the Poynting vector $\bar{P}$ will rotate 90° around the H vector in order to continue to point towards the direction of energy flow. As the Poynting vector $\bar{P}$ rotates, the $\bar{E}$ vector will also rotate so that the resulting output signal from the E port 129 is represented by the vector diagram S.

The flow of energy between T junctions 100 and 104 through the other circuit path, which includes switch 106, will now be considered to illustrate the 180° orientation difference produced therethrough at the output port 129 of T junction 104, as compared with the phase of the signal flowing through the circuit path which includes switch 102. When switch 106 is conductive, the energy will flow from symmetric port 125 of junction 100, through phase shift means 105, switch 106, phase shift means 107, and to the symmetric port 127 of E plane T junction 104. The vector diagrams B and D represent, respectively, the orientation of the signal as it emanates from port 125 of junction 100 and enters into port 127 of T junction 104. It can be seen that the two vector diagrams have the same orientation with respect to the circuit path connecting ports 125 and 127.

Here again as the energy signal entering port 127 turns upwards 90° to enter the E port 129 of T junction 104, it is necessary that the Poynting vector $\bar{P}$ rotate 90° around the $\bar{H}$ vector, thus producing an output signal at the output of port 129 as represented by vector diagram F.

A comparison of vector diagram F and vector diagram S shows that the $\bar{E}$ vectors of these two vector diagrams are 180° out of phase with each other. Thus modulation of the carrier signal has been effected, with the E plane T junction 104 functioning, not only to introduce 180° phase shift into the carrier signal, but also to recombine the two portions of the carrier signal supplied thereto through switches 102 and 106 into a single signal.

Consider next the demodulating portion of the invention. The resultant modulated signal is supplied from output port 129 of T junction 104 through a suitable transmission line 120 to the input symmetric port 130 of a hybrid T junction 108, which provides the demodulating function at the receiver. A reference signal represented by the vector diagram M, is supplied to the other input symmetric port 116 of the hybrid T junction 108. It is to be specifically noted that the received signal is represented by both the vector diagram K or the vector diagram W, although not simultaneously, and depending upon whether the said received signal was derived from a carrier signal flowing through 106 or switch 102 at the modulator. The reference signal represented by vector diagram M can be generated in any suitable way. It must however be phase locked with one or the other of the two phase modes of the received signal. The particular phase mode to which it is locked is not important, since the only difference in the demodulated output signal will be an inversion thereof.

Assume for purposes of discussion that the reference signal is as represented by the vector diagram M. Under such assumption, when the received signal is as represented by vector diagram K, there will be an output signal from the collinear H port 136 of junction 108. More specifically, since both vector diagrams M and K must rotate around their $\bar{E}$ vectors in order for the Poynting vector $\bar{P}$ to remain pointing in the direction of energy flow in the H port, and further since both $\bar{E}$ vectors are initially pointing upwards in the vector diagrams M and K, it is apparent that $\bar{E}$ vectors will remain in phase in the H port 136 and will produce an output signal therefrom.

On the other hand, there will be no output signal produced from the output E port 135 since both vector diagrams M and K must rotate around their $\bar{H}$ axes in order for the Poynting vector $\bar{P}$ to point upwards. Since the two vector diagrams M and K will rotate, respectively, in a counterclockwise and a clockwise direction, the two $\bar{E}$ vectors will rotate into opposing positions, thus producing a cancelling effect at the output E port 135. In the foregoing discussion, it is assumed that the amplitudes of the received signal and the reference signal are the same.

On the other hand, when the received signal is represented by vector diagram W, there will be an output from the E port 135 and no output from the H port 136. More specifically, as the vector diagram M and W rotate around their $\bar{E}$ axes when the signals make the turn into the H port 136, the $\bar{E}$ axes which are initially oppositely phased, as shown in vector diagrams M and W, will remain so. Thus there will be no output signal from H port 136. However, as the energies represented by vector diagrams M and W flow into E port 135, they will rotate around their H vectors in a counterclockwise and a clockwise direction, respectively, so that the two $\bar{E}$ vectors will become coincident and will produce an output from said E port 135.

Thus it can be seen that a received signal of one phase will produce an output from the H port 136 but no output from E port 135 and the received signal of the other phase will produce an output from E port 135, but no output from H port 136.

Figure 2:
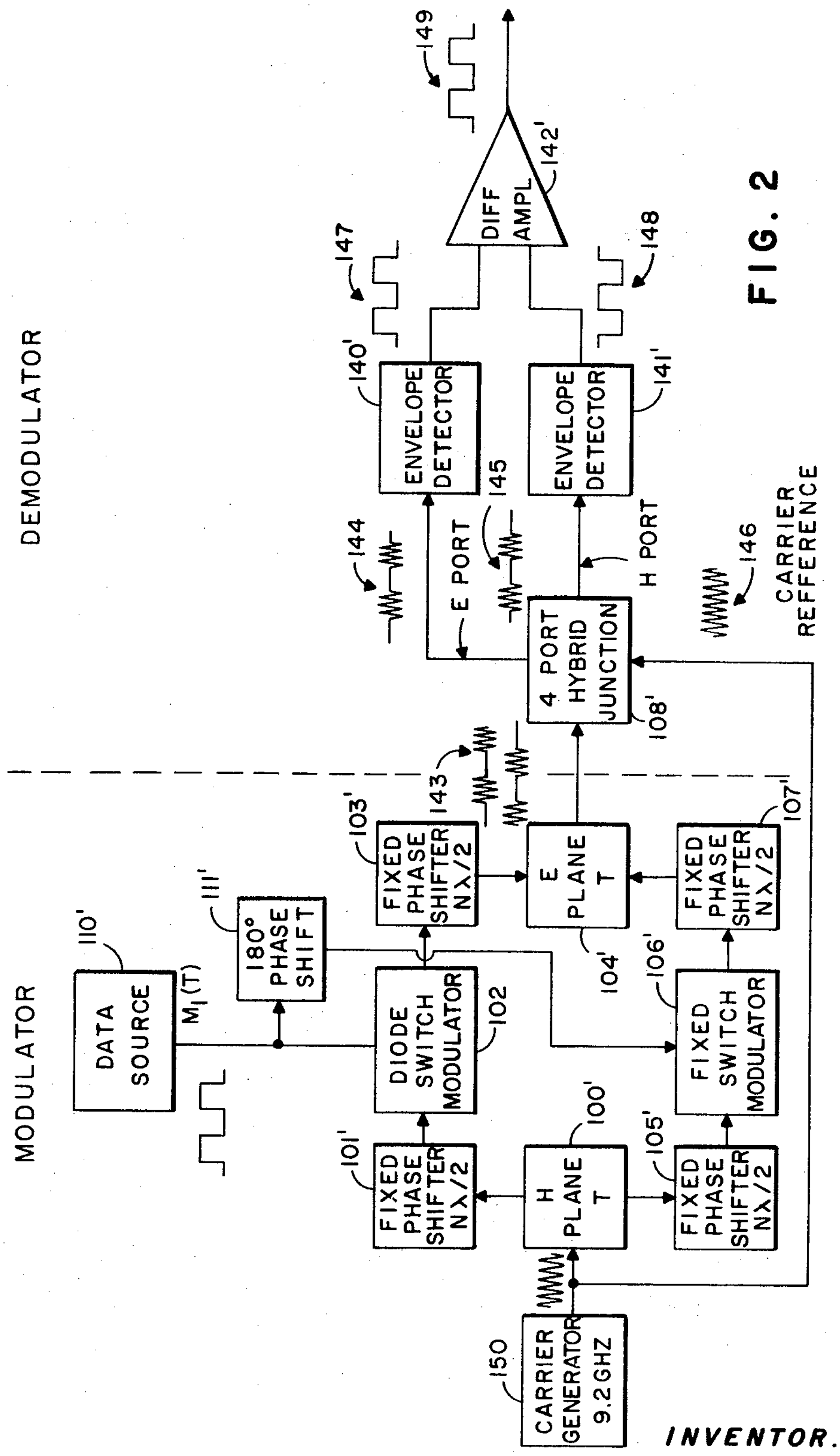
FIG. 2 is a block diagram of the entire system.

Through the use of an envelope detector and a differential amplifier, the original two-level data signal supplied from data source 110 can be reconstructed in the manner shown in FIG. 2.

More specifically, in FIG. 2, the waveforms 144 and 145 represent the output of ports 135 and 136, respectively, and show the alternating occurrence of said output signals as a result of the received signal being divided into its two phase modes and supplied to the E and H output ports, respectively, of hybrid junction 108. Such output signals are supplied to the envelope detectors 140 and 141 which respond thereto to produce output waveforms represented by the waveforms 147 and 148 (which are seen to be inverted forms of each other). Such waveforms 147 and 148 are supplied through differential amplifier 142 to produce a resultant signal 149, which is a substantial reproduction of the two-level data signal originally obtained from the data source 110 at the modulator.

The remaining portion of FIG. 2 is essentially a block diagram form of the structure of FIG. 1, with the corresponding elements being identified by the same reference characters, although primed in FIG. 2. The carrier generator is shown as a separate block 150 in FIG. 2.

The two waveforms 143 represent the biphase nature of the signal supply from the E plane T junction 104′ to the hybrid junction 108′.

Referring now to FIG. 3, there is shown a series of vector diagrams showing the modulation and demodulation of the carrier signal when the switch 106″ is on and the switch 102″ is off. Most of these vector diagrams shown in FIG. 3 are also shown in FIG. 1 and identified by the same reference character, although primed.

The input signal represented by vector diagram A′ flows from symmetric port 125′ where it is represented by the vector diagram B′. The signal then makes a turn in the transmission line and flows through modulator 106″. Due to the turn in the transmission line, the energy is now represented by vector diagram C. After the next turn at point 156 in the transmission line, the energy is represented by vector diagram D. The signal is then, with the orientation of vector diagram D, supplied to the symmetric port 127′ of T junction 104″.

As discussed before, the resultant output signal from port 129′ of T junction 104″ is represented by the vector diagram F′, which signal is then transmitted through transmission line 160, which has three turns therein; one at each of the points 157, 158 and 159. The vector diagrams G, J and K represent the orientation of the signal after each of these three turns. The last mentioned vector diagram K′ shows the orientation of the signal as it is supplied to the port 130′ of hybrid T junction 108″ at the receiver. As discussed in connection with FIG. 1, such received signal is compared with a reference signal, represented by vector diagram M′ in port 116′ of hybrid junction 108″, and an output signal is produced at the H port 136 only. Such output signal is represented by vector diagram L and is supplied to one of the envelope detectors 141′ of FIG. 2.

Referring now to FIG. 4, there is shown a series of vector diagrams illustrating the modulation and demodulation process of the carrier signal which is passed through switch 102‴. The vector diagram Q′ shows the orientation of the output signal as it leaves the T plane junction 100‴. After said signal turns the corner 162 of the transmission line, it is reoriented as shown by vector diagram R. The signal then passes through modulator 102‴ and then turns another corner 163, at which point it is reoriented as represented by vector diagram T′ and supplied to input port 128′ of T junction 104‴. The output of T junction 104‴ is as represented by the vector diagram S′ and is obtained in the manner described in connection with FIG. 1.

The signal from port 129″ is then supplied over transmission line 160′ and turns corners 166, 167 and 168 to reorient itself as shown respectively by vector diagrams U, V and W′, with the last-mentioned vector diagram W′ representing the orientation of the signal as it enters the port symmetric 130″ of hybrid T junction 108‴.

As discussed hereintofore, said junction 108‴ compares the received signal of vector diagram W′ with the carrier reference signal of vector diagram M″ to produce an output from E port 135′. Such output signal is represented by vector diagram X and is supplied to envelope detector 140′ of FIG. 2.

Referring now to FIG. 5, the input signal represented by vector diagram A‴ is supplied to the collinear port 169 of the E plane T junction 170 where it divides and passes out of the two symmetric ports 171 and 178.

Consider first the flow of energy from the output port 171. Such a signal is represented by the vector diagram B B which passes through the modulator switch 172 and then into the symmetric port 173 of the H plane T junction 174. The vector diagram C C represents the signal as it enters the said port 173. After making the turn in the H plane T junction 174, the signal exits from port 175 and is represented by the vector diagram D D. Such a signal is then transmitted over a suitable transmission means 185 to an input port 176 of the hybrid junction 186 located at the receiver. The signal, as it enters the said port 176 is represented by the vector diagram E E. Supplied to the other symmetric port 184 of the hybrid junction 186 is the reference signal represented by the vector diagram M M. The two signals represented by the vector diagrams E E and M M then combine in the H port 177 to produce a signal represented by the vector diagram F F. It is to be noted that the vectors E of the two signals represented by the vector diagrams E E and M M are collinear and add as they turn into the H port 177 so that a signal is obtained from said H port 177.

On the other hand, the $\bar{E}$ vectors of the vector diagrams E E and M M subtract as the two signals turn into the E port 181 so that cancellation occurs and no output is obtained from said E port.

Consider now the energy flowing from the output of symmetric port 178 of the E plane T junction at the transmitter of the system. The output from said symmetric port 178 is represented by the vector diagram G G which passes through a modulator switch 179 and then into one of the symmetric ports 180 of the H plane T junction 174. Vector diagram H H represents the vector diagram as a signal as it passes into the said symmetric input port 180.

After the waveform makes a turn in the H plane T junction into the H port 175 it will have form represented by the vector diagram I I.

Such signal is then transmitted over a suitable transmission means 185 to the input port 176 of the hybrid junction 186 located at the receiver site.

An examination of the vector diagrams J J and the reference signal represented by vector diagram M M will show that as the signals represented by these two vector diagrams make the turn into the E port 181 of the hybrid junction 186, the $\bar{E}$ vectors will be aligned so that an output is obtained from said E port 181.

On the other hand as the signals represented by the vector diagrams J J and M M make the turn into the H port 177, the $\bar{E}$ vectors will remain in opposition to each other so that no output is obtained from said H port.

Thus it can be seen that signals flowing out of the symmetric port 171 of the E plane T junction 170 at the transmitter will produce an output from the H port 177 in the hybrid junction 186 at the receiver, but no output from the E port junction 181. On the other hand, signals flowing out of the symmetric port 178 of the E plane T junction 170 at the receiver will produce an output from the E port 181 of the hybrid junction 186 at the receiver but no output from the H port junction 177 of said hybrid junction 186.

It is to be understood that the form of the invention shown and described herein is but a preferred embodiment thereof and that various changes and modifications may be made therein without departing from the spirit or scope of the invention. For example, other workable combinations of T junctions will be apparent to those skilled in the art without the exercise of invention.

In the claims:

1. A data encoding system comprising modulator means and demodulator means comprising:
- a first H plane T junction having first and second symmetric ports and a collinear port;
- means for supplying an input carrier signal into said collinear port;
- and a first E plane T junction means having first and second symmetric ports and a collinear port;
- first switching means constructed to respond to a control signal to connect or to disconnect the first symmetric port of said H plane T junction to the first symmetric port of said E plane T junction;
- second switching means constructed to respond to a control signal to connect or to disconnect said second symmetric port of said H plane T junction to said second symmetric port of said E plane T junction;
- means for generating and supplying to said first and second switching means a control signal having at least a first state and a second state to cause each of said first and second and switching means to become conductive in response to said first and second states, respectively, of said control signal;
- demodulator means including further T junction means comprising first and second symmetric input ports and at least one output port;
- means for supplying the signal output from said collinear port of said E plane T junction to said first symmetric input port of said further T junction means of said demodulator means; and
- means for generating and supplying a reference signal, which is phase locked to one of the output signals from said collinear port of said first H plane T junction, to said second symmetric port of said further T junction.

2. A data encoding system in accordance with Claim 1 in which said further T junction means is a hybrid comprising first and second symmetric input ports, an E output port, and a H output port and said demodulator means further comprises:
- means for detecting the output of at least one of said H and E ports of said hybrid further T junction.

3. A data encoding system in accordance with Claim 1 in which said further T junction means is an E plane comprising first and second symmetric input ports and E output port and said demodulator means further comprises:
- means for detecting the output of said E port of said E plane further T junction.

4. A data encoding system in accordance with Claim 1 in which said further T junction means is an H plane comprising first and second symmetric input ports and an H output port and said demodulator means further comprises:
- means for detecting the output of said H port of said H plane further T junction.

5. A date encoding system comprising modulator means and demodulator means, with said modulator means with said modulator means comprising:
- a first E plane T junction having first and second symmetric ports and a collinear port;
- means for supplying an input carrier signal into said collinear port;
- a first H plane T junction having first and second symmetric ports and a collinear port;
- first switching means constructed to respond to a control signal to connect or to disconnect the first symmetric port of said first E plane T junction to the first symmetric port of said first H plane T junction;
- second switching means constructed to respond to a control signal to connect or to disconnect said second symmetric port of said first E plane T junction to said second symmetric port of said first H plane T junction;
- means for generating and supplying a two-level control signal to said first switching means and an inverted form of said two-level control signal to said second switching means to cause first said switching means to become conductive during a first level of said two-level control signal and said second switching means to become conductive during said second level of said two-level control signal;
- demodulator means including further T junction means comprising first and second symmetric input ports and at least one output port;
- means for supplying the signal output from said collinear port of said H plane T junction to said first symmetric input port of said further T junction means of said demodulator means; and
- means for generating and supplying a reference signal, which is phase locked to one of the output signals from said collinear port of said first E plane T junction, to said second symmetric port of said further T junction.

6. A data encoding system in accordance with Claim 5 wherein said output port of said further T junction means is a collinear port and said demodulator means further comprises:
- means for detecting the output signal appearing at said collinear port of said further T junction means.

7. A data encoding system in accordance with Claim 5 in which said further T junction means is an E plane comprising first and second symmetric input ports and an E output port and said demodulator means further comprises:
- means for detecting the output of said E port of said E plane further T junction.

8. A data encoding system in accordance with Claim 5 in which said further T junction means is an H plane comprising first and second symmetric input ports and an H output port and said demodulator means further comprises:
- means for detecting the output of said H port of said H plane further T junction.

9. A data encoding system comprising modulator means and demodulator means, with said modulator means comprising:
- a first E plane T junction and a first H plane T junction, each comprising first and second symmetric ports and a collinear port;
- first and second switching means constructed to respond to a control signal to connect the first and second ports, respectively, of said H plane T junction to the first and second ports, respectively, of said E plane T junction;
- means for supplying an input carrier signal to a first of said collinear ports;

means for generating and supplying to said first and second switching means a control signal having at least a first state and a second state to cause each of said first and second switching means to become conductive in response to said first and second states, respectively, of said control signal;

demodulator means including further T junction means comprising first and second symmetric input ports and at least one output port;

means for supplying an output signal from the other of said collinear ports to said first symmetric input port of said further T junction means of said demodulator means; and means for generating and supplying a reference signal, which is phase locked to a signal appearing at one of said collinear ports of said first E plane T junction and said first H plane T junction, to said second symmetric port of said further T junction.

10. A data encoding system in accordance with Claim 9 in which said further T junction means is an E plane comprising first and second symmetric input ports and an E output port and said demodulator means further comprises:

means for detecting the output of said E port of said E plane further T junction.

11. A data encoding system in accordance with Claim 9 in which said further T junction means is a hybrid comprising first and second symmetric input ports, an E output port, and an H output port and said demodulator means further comprises:

means for detecting the output of at least one of said H or E ports of said hybrid further T junction.

12. A data encoding system in accordance with Claim 9 in which said further T junction means is an H plane comprising first and second symmetric ports and an H port and said demodulator means further comprises:

means for detecting the output of said H port of said second H plane T junction.